March 14, 1950     D. W. DUNIPACE     2,500,278
APPARATUS FOR BENDING GLASS SHEETS Filed April 3, 1941     2 Sheets-Sheet 1

Inventor
DONALD W. DUNIPACE.
By Frank Fraser
Attorney

March 14, 1950           D. W. DUNIPACE           2,500,278
APPARATUS FOR BENDING GLASS SHEETS
Filed April 3, 1941                         2 Sheets-Sheet 2

Inventor
DONALD W. DUNIPACE,
By Frank Fraser
Attorney

Patented Mar. 14, 1950

2,500,278

UNITED STATES PATENT OFFICE 2,500,278

APPARATUS FOR BENDING GLASS SHEETS

Donald W. Dunipace, Toledo, Ohio, assignor to Libbey-Owens-Ford Glass Company, Toledo, Ohio, a corporation of Ohio Application April 3, 1941, Serial No. 386,575

5 Claims. (Cl. 49—67)

The present invention relates to an improved apparatus for bending sheets or plates of glass and the like.

Although this invention is of particular utility in the bending of glass sheets in pairs for use in the making of laminated safety glass and is so illustrated, it will be understood that the method and apparatus herein disclosed are equally applicable for the bending of single sheets or plates.

A common method of bending glass heretofore used has been to place a flat sheet of glass on a concave mold and then apply sufficient heat to soften the glass and cause it to drop downwardly to fit the contour of the mold. Since the length of the flat sheet of glass is always longer than the chord of the finished curve, the ends of the glass sheet always have to slip for a distance along the mold toward the center. This sets up considerable friction between the glass and mold so that a relatively high temperature must be used to cause the glass to sag and take the contour of the mold. Also, in making a bend of this kind there is a tendency for the corners of the glass sheet to bend upwardly and the very soft nature of the glass aggravates this condition to such an extent that it is sometimes necessary to use a tool to push the corners of the sheet down to fit the mold. This is, of course, very apt to result in distortion of the glass. Furthermore, the bending of glass sheets in this manner is relatively slow and laborious and tends to mar the glass as it is given a somewhat wavy or battered appearance by contact with the mold surface.

It is an aim of this invention to provide a novel apparatus for bending glass sheets either singly or in pairs in a more rapid, accurate and economical manner and to give a product whose surfaces are in no way impaired by the bending operation.

Another object of the invention is to provide such an apparatus for bending glass sheets in which the use of bending molds is entirely eliminated whereby burning, pitting, or otherwise marring of the glass surface by contact with the mold is avoided.

A further object of the invention is to provide such an apparatus for bending glass sheets wherein the glass is shaped by exerting a bending torque throughout the sheet so that there is an equal tendency for all parts of the sheet, upon being heated, to bend to a constant uniform curvature.

A still further object of the invention is to provide such an apparatus for bending glass sheets whereby it is possible to obtain a more uniform curve as well as sharper bends, and also wherein less temperature is required in heating the sheet for bending, thereby obviating the tendency towards spoiling of the glass surface by excessively high temperatures.

Other objects and advantages of the invention will become more apparent during the course of the following description, when taken in connection with the accompanying drawings.

In the drawings, wherein like numerals are employed to designate like parts throughout the same:

Figure 1:
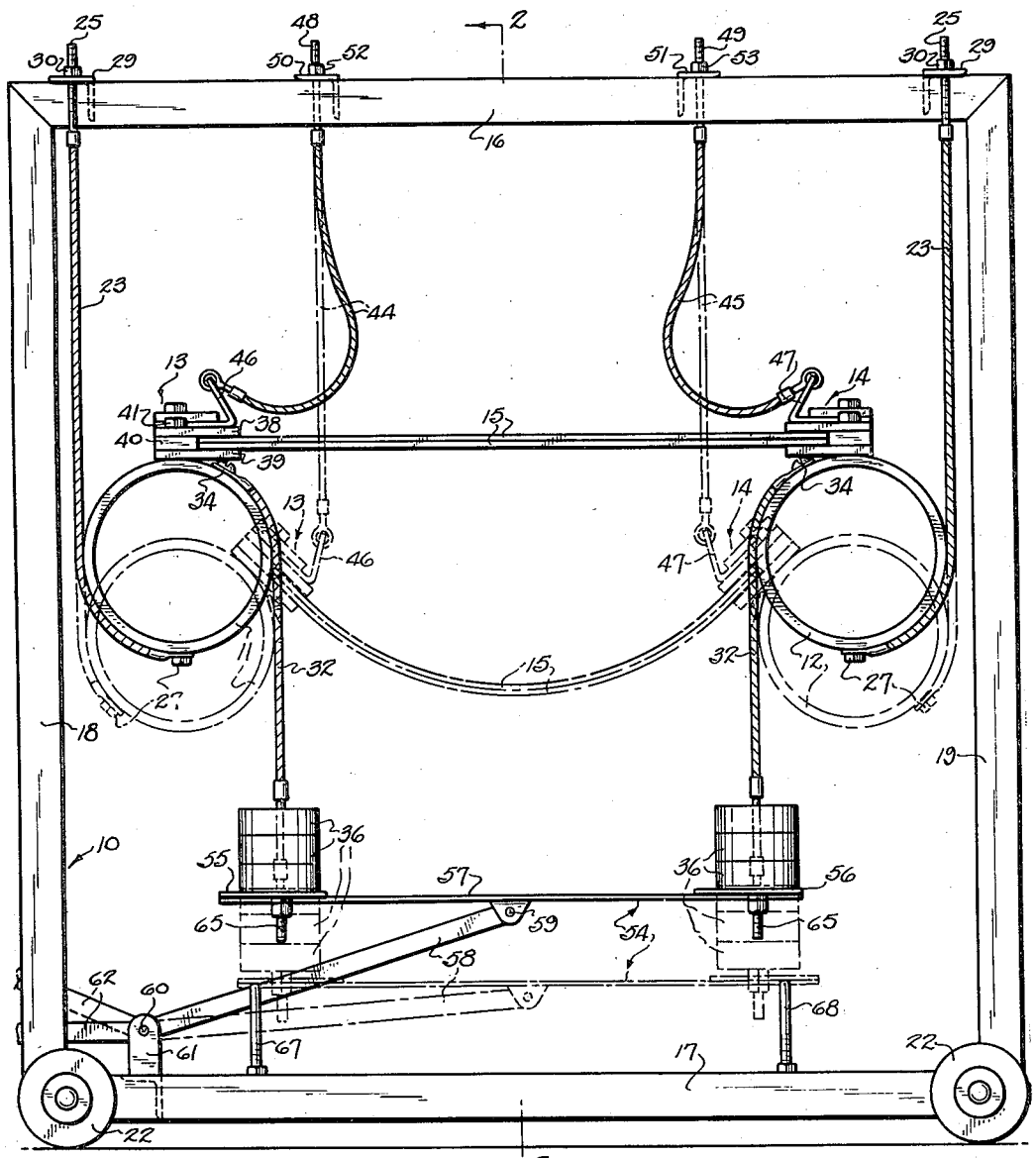
Fig. 1 is a side elevation of a glass bending apparatus constructed in accordance with the present invention.

With reference now to the drawings, the apparatus therein shown comprises in general a rectangular supporting carriage 10 carrying a pair of horizontal cylinders 11 and 12 arranged in horizontally spaced parallel relation and provided with holders 13 and 14 respectively for supporting therebetween one or a pair of glass sheets 15 to be bent.

The supporting carriage 10 is provided at each end with a vertical frame including the horizontal top and bottom members 16 and 17 and the vertical side members 18 and 19. The two end frames are secured together at the two upper corners thereof by cross members 20 and at their two lower corners by cross members 21. The carriage is preferably supported at the four corners thereof upon wheels or rollers 22 which facilitate the introduction of said carriage into and its removal from a suitable heating furnace.

Each of the horizontal cylinders 11 and 12 is supported at its opposite ends by cables 23 and 24 fastened at their upper ends to bolts 25 and 26 respectively, while the lower ends thereof are wrapped around the underside of the respective cylinder on the side thereof away from the other cylinder and secured to the bottom of said respective cylinder at 27 and 28. The points of attachment (27 and 28) of the cables 23 and 24 to the cylinder are opposite the position of the respective glass holders 13 and 14. The bolts 25 and 26 pass upwardly through openings in a cross member 29 carried by the carriage 10 and have threaded upon their upper ends nuts 30 and 31 respectively.

Also secured to each cylinder 11 and 12, adjacent the opposite ends thereof, are cables 32 and 33; said cables being fastened at their upper ends to said cylinder under the respective glass holders 13 and 14, as indicated at 34 and 35, while carried at the lower ends of said cables are weights 36 and 37.

Figure 3:
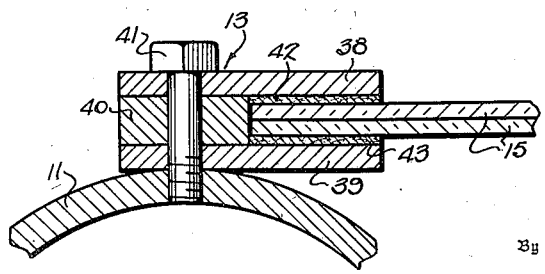
Fig. 3 is an enlarged detail sectional view of one of the glass clamps.

Each of the glass holders 13 and 14 comprises spaced upper and lower plates 38 and 39 for receiving therebetween the adjacent edge of the glass sheet or sheets 15 to be bent; said plates being held spaced from one another by a spacer block 40 and secured to the respective cylinder 11 or 12 by bolts or the like 41. The bolts 41 pass downwardly through the plates 38 and 39 and also through the spacer block 40, being threaded within the cylinder as shown in Fig. 3. The inner surfaces of the plates 38 and 39 may be covered with layers of asbestos or the like 42 and 43.

In the operation of the apparatus above described, the glass sheet or sheets 15 to be bent are first supported horizontally by and between the holders 13 and 14 in the manner illustrated in full lines in Fig. 1. At this time, the holders are disposed in horizontal alignment with one another and are arranged at the tops of the cylinders 11 and 12. When the parts are so arranged, the weights 36 will tend to rotate the cylinders 11 and 12 in opposite directions (the cylinder 11 in a clockwise direction and the cylinder 12 in a counterclockwise direction as viewed in Fig. 1), but the rigidity of the glass sheet or sheets 15 will prevent the cylinders from turning until the glass is heated and softened. In other words, the weights 36 will produce a torque in the cylinders which tends to bend the glass when heated, but the glass is clamped tangentially to the cylinders in such a way that the rotation of said cylinders is possible only as the glass bends.

After the glass sheet or sheets 15 have been secured in place, the carriage 10 is rolled into a suitable heating furnace and the glass subjected to a temperature sufficient to effect the heating and softening thereof. As the glass becomes softened, the weights 36 will cause a rotation of the cylinders 11 and 12 in opposite directions to exert a bending torque throughout the sheet or sheets and thereby effect the bending thereof as shown by the broken lines in Fig. 1. In other words, there is an equal tendency for all parts of the sheet upon being heated to bend simultaneously throughout to a uniform curvature. This is due to the twisting action of the holders 13 and 14 on those edges of the sheet which are parallel to the axis of the bend. By eliminating all other bending forces, it is possible to obtain a constant uniform curvature. Also, since the use of bending molds or forms is entirely eliminated the danger of burring, pitting, or otherwise marring the glass surface during the bending operation is avoided. It is of course preferred that the sheets be uniformly heated to facilitate uniform bending of the glass. The weights 36 and 37 produce a torque in the cylinders 11 and 12 which tends to bend the glass when heated, and it has been found that as the torque is increased the bending temperature can be decreased. It has been further found that with the present method and apparatus less temperature is required in heating the sheet for bending so that the tendency toward spoiling of the glass surface by excessively high temperatures is avoided.

The bending operation continues until further rotation of the cylinders 11 and 12 is prevented by the cables 44 and 45 associated with said cylinders. More particularly, the cables 44 and 45 are secured at their lower ends to brackets 46 and 47 carried by the glass holders 13 and 14 respectively and at their upper ends to bolts 48 and 49. The bolts 48 and 49 pass upwardly through angle members 50 and 51 carried by the supporting carriage and have threaded upon their upper ends nuts 52 and 53. When the cables 44 and 45 are pulled taut, as indicated by broken lines in Fig. 1, the cylinders 11 and 12 will also be in the broken line position and further rotation thereof will be effectively prevented. By proper adjustment of the nuts 52 and 53, the extent of rotation of the cylinders 11 and 12 can be varied to give the desired type of bend.

Figure 4:
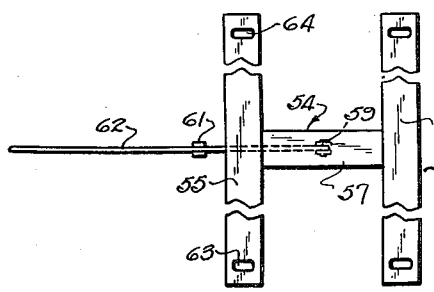
Fig. 4 is a detail plan view of the platform for supporting the bending weights.

Although not always essential, it is sometimes preferred to heat the glass and bending apparatus before the bending torque is applied to the cylinders 11 and 12. One way in which this may be accomplished is illustrated in the drawings and includes a horizontal platform 54 for supporting the weights 36 and 37 during the heating of the glass and apparatus and which can then be lowered to permit the application of the bending torque when the desired temperature has been reached. The horizontal platform 54 is substantially H-shaped as best shown in Fig. 4 and includes the spaced parallel legs 55 and 56 and the transverse arm 57 connecting said legs intermediate the ends thereof.

The platform 54 is positioned horizontally beneath the weights 36 and 37 of the cylinders 11 and 12 and is carried at the outer end of a bar 58; said bar being pivoted to the arm 57 as indicated at 59 and at its opposite end upon a horizontal pin 60 carried by a bracket 61 secured to the carriage 10. Fixed to the outer end of the bar 58 or formed integral therewith is an operating lever 62 extending at an angle to bar 58, so that upon downward movement of lever 62 the outer end of bar 58 will be moved upwardly to raise the platform 54. When in raised position, the leg 55 of platform 54 will support the weights 36 and 37 attached to cylinder 11, while the leg 56 will support the weights 36 and 37 attached to cylinder 12. Each leg 55 and 56 is provided at its opposite ends with slots 63 and 64 through which pass the bolts 65 and 66 supporting the weights 36 and 37.

Figure 2:
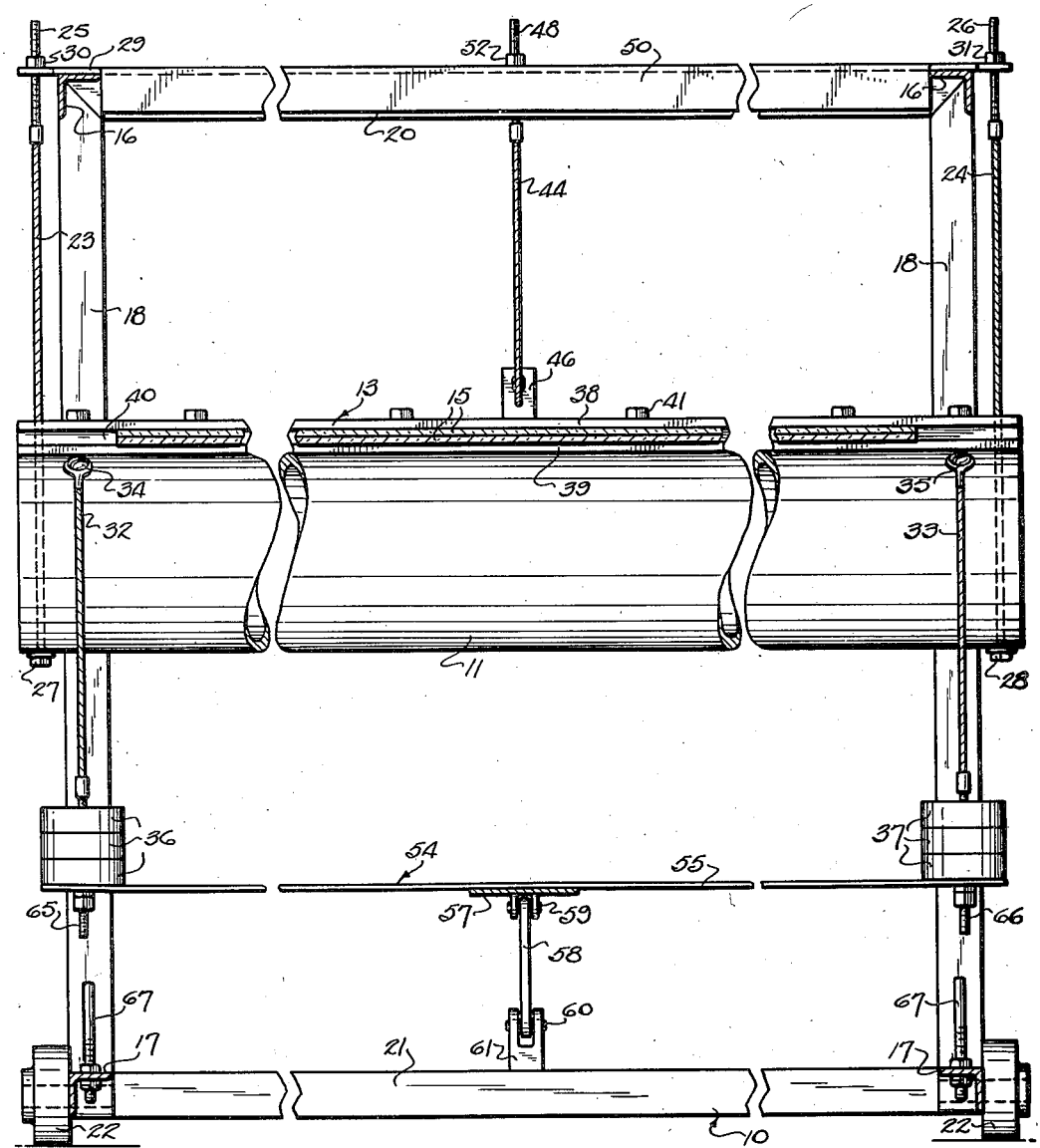
Fig. 2 is a vertical sectional view therethrough taken substantially on line 2—2 of Fig. 1.

In practice, it is preferred that the platform 54 be in elevated full line position shown in Figs. 1 and 2 to support the weights 36 and 37 during the period of heating up of the glass in the furnace. However, as soon as the glass has been sufficiently heated the platform can be lowered so that the bending torque can be applied to the cylinders and the bending of the glass effected in the manner explained above. To limit the downward movement of the platform 54 and also to prevent tilting thereof there may be carried by the carriage 10 vertical pins 67 engageable by the opposite ends of leg 55 of the platform and similar pins 68 engageable by the opposite ends of leg 56.

Although the cylinders 11 and 12 are illustrated in the drawings and have been above described as arranged in a horizontal position, they may in some cases be disposed vertically to effect vertical bending instead of horizontal bending of the glass sheet or sheets. Also, while there has been specifically described hereinabove the forming of uniform bends, it is possible to obtain non-uniform bends by causing a greater bending torque on one cylinder than on the other. Likewise, conical bends may be obtained such as by arranging the cylinders at an angle to one another.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. Apparatus for bending glass sheets, comprising a pair of horizontal cylinders arranged in horizontally spaced substantially parallel relation at a distance apart that is substantially equal to one dimension of the glass sheet to be bent, holders carried by said cylinders for horizontally supporting the glass sheet to be bent above the said cylinders and at opposite edges thereof only, and flexible suspending supports mounting said cylinders for rotative movement in opposite directions about their own axes and for simultaneous bodily movement toward and away from one another, the glass sheet serving to prevent rotation of the cylinders until the glass is heated to the desired temperature whereupon said holders will be caused to move inwardly and downwardly about the axes of rotation of the cylinders and the said cylinders caused to move simultaneously downwardly through a vertical path to impart a twisting action to those edges of the glass sheet parallel to the axis of the bend to effect the bending of said sheet.

2. Apparatus for bending glass sheets comprising, a pair of cylinders spaced from one another a distance substantially equal to one dimension of a sheet to be bent and mounted for relative movement about their own axes, sheet holders carried by said cylinders and shaped to engage the glass sheet to be bent along its marginal portions at opposite edges thereof only, and means for rotating said cylinders when said sheet is engaged by said holders and the glass has been heated in directions to move said glass holders inwardly through arcs about the axes of rotation of said cylinders.

3. Apparatus for bending glass sheets comprising, a pair of horizontal cylinders arranged in horizontally spaced, parallel relation and mounted for rotative movement about their own axes, sheet holders carried by said cylinders spaced from one another a distance equal to one dimension of a sheet to be bent and shaped to engage the glass sheet to be bent along its marginal portions at opposite edges thereof only when said sheet is arranged above said cylinders, and means for urging rotation of said cylinders when the glass has been softened in directions to move said sheet holders inwardly and downwardly about the axes of rotation of said cylinders.

4. Apparatus for bending glass sheets comprising, a pair of horizontal cylinders arranged in horizontally spaced, parallel relation and mounted for rotative movement about their own axes, sheet holders carried by said cylinders spaced from one another a distance corresponding to a dimension of a sheet to be bent and shaped to engage the glass sheet to be bent all along its marginal portions at opposite edges thereof only when said sheet is arranged above said cylinders, means for rotating said cylinders when the glass has been softened in directions to move said sheet holders inwardly and downwardly about the axes of rotation of said cylinders, and means for limiting the amount of rotative movement of said cylinders.

5. Apparatus for bending glass sheets comprising, a pair of horizontal cylinders arranged in horizontally spaced, substantially parallel relation at a distance from one another substantially equal to a dimension of the glass sheet to be bent, a pair of cables secured to each of said cylinders and partially surrounding the peripheries thereof when the cylinders are in bending position, holders carried by said cylinders and shaped to engage the glass sheet to be bent along its margins at opposite edges thereof only when said sheet is arranged above the center lines of said cylinders, weights suspended from a point on the peripheries of said cylinders above the lowermost point for urging rotation thereof when the glass has been softened in directions to move said holders inwardly and downwardly about the axes of rotation of said cylinders, and means for limiting the rotative movement of said cylinders.

DONALD W. DUNIPACE.

REFERENCES CITED

The following references are of record in the file of this patent:

UNITED STATES PATENTS

| Number | Name | Date |
|---|---|---|
| 760,959 | Connington | May 24, 1904 |
| 1,999,558 | Black | Apr. 30, 1935 |
| 2,330,349 | Galey | Sept. 28, 1943 |